W. M. NECKERMAN.
APPARATUS FOR MAKING LAPWELD PIPES.
APPLICATION FILED NOV. 1, 1913.
1,106,577.
Patented Aug. 11, 1914.
2 SHEETS—SHEET 1.
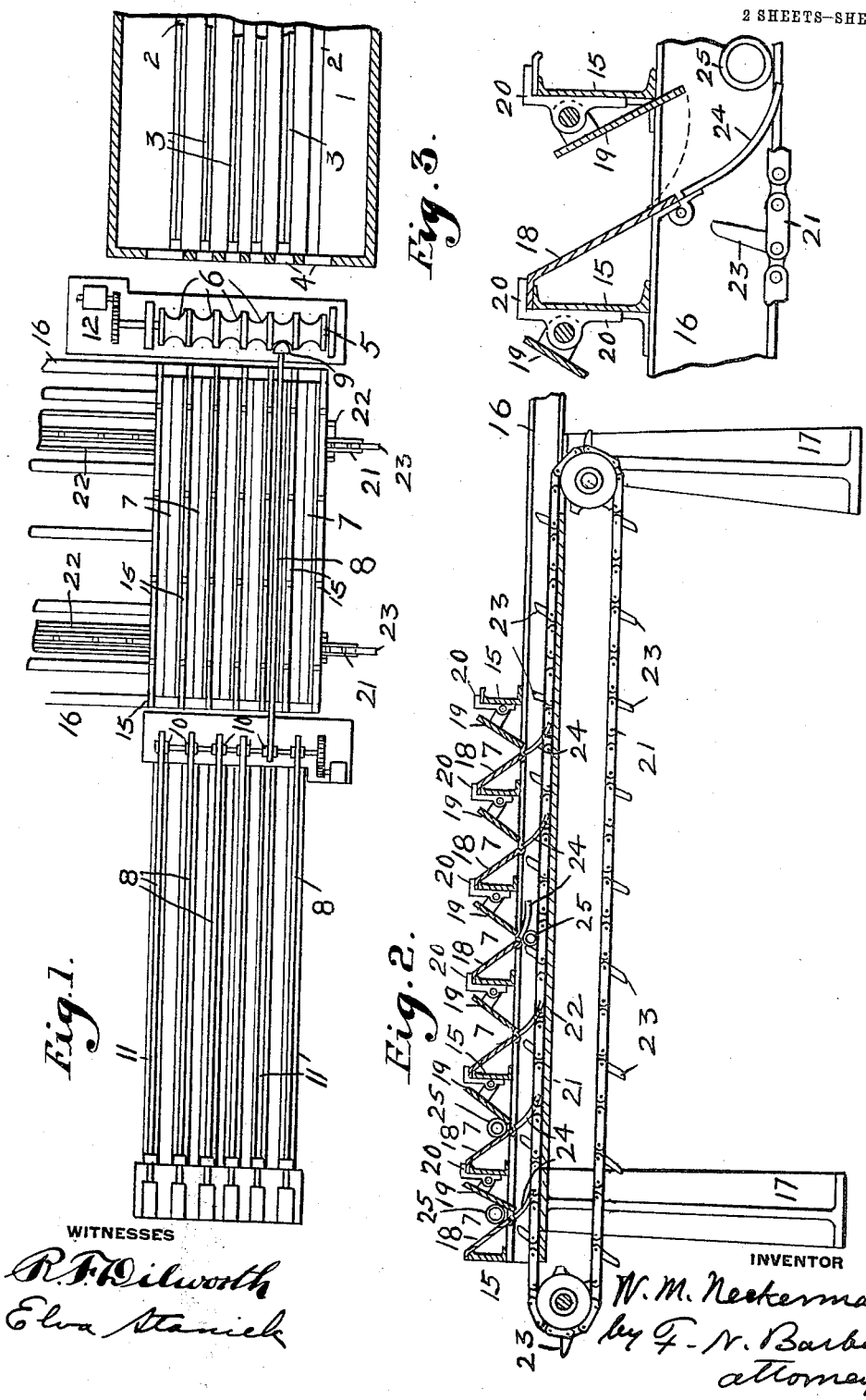
WITNESSES
R. F. Dilworth
Elva Staniels
INVENTOR
W. M. Neckerman
by F. N. Barber
attorney

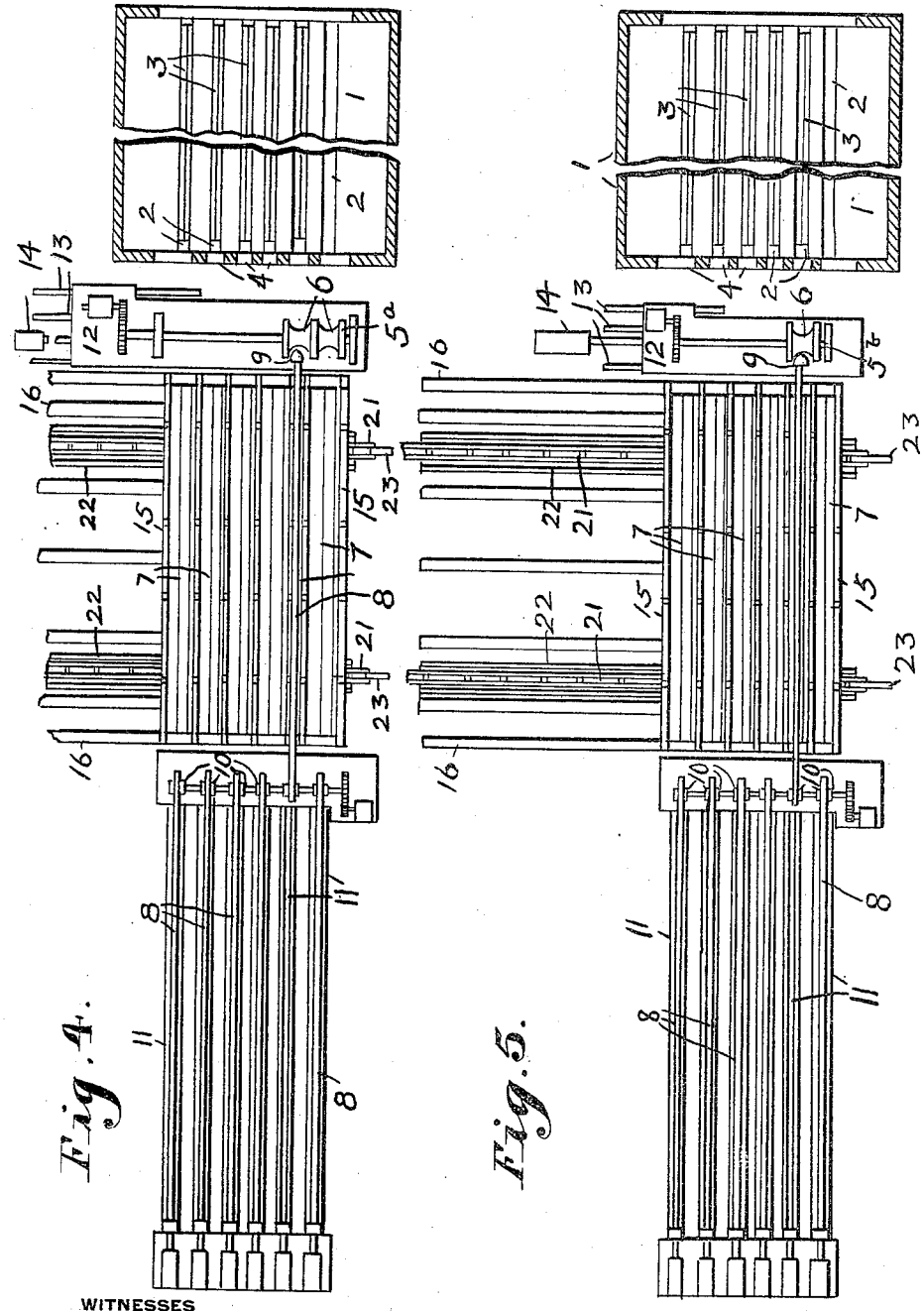

UNITED STATES PATENT OFFICE.

WILLIAM MARTIN NECKERMAN, OF YOUNGSTOWN, OHIO, ASSIGNOR TO THE YOUNGSTOWN SHEET AND TUBE COMPANY, OF YOUNGSTOWN, OHIO, A CORPORATION OF OHIO.

APPARATUS FOR MAKING LAPWELD-PIPES.

1,106,577.

Specification of Letters Patent. Patented Aug. 11, 1914.

Application filed November 1, 1913. Serial No. 798,683.

*To all whom it may concern:*

Be it known that I, WILLIAM M. NECKERMAN, a citizen of the United States, residing at Youngstown, in the county of Mahoning and State of Ohio, have invented new and useful Improvements in Apparatus for Making Lapweld-Pipes, of which the following is a specification.

My invention relates to apparatus for making lap-weld pipes.

One object of my invention is to provide an apparatus whereby the skelp may be allowed to remain until properly heated in the positions in which they are charged into the welding furnace, whereby the heated skelp may be pushed to the welding rolls without previously moving them laterally in the furnace, whereby the mandrel-bars are pulled by preferably separate pullers in line with each skelp, whereby the welded pipes may drop into separate welding troughs in line with the position which the skelp had in the furnace; and whereby the welded pipes may be removed from the welding troughs without interfering with the operations of the said apparatus, and preferably without transferring any of the pipes over the welding troughs. Preferably, I employ a welding roll having as many welding grooves or passes as there are gutters or skelp-heating positions in the furnace, but I may employ traveling welding rolls with fewer welding grooves or passes than the number of gutters or skelp-heating positions, and I may use a pair of welding rolls with only a single pass. The foregoing outline of my invention expresses the same in its most limited scope, since some portions of the same may be modified without departing from the scope of the appended claims, for mechanism not definitely limited therein may be any mechanism suitable for the purposes provided such mechanism be the functional and mechanical equivalents of mechanism disclosed in the specification and drawings.

Referring to the accompanying drawings, Figure 1 is a plan of that form of my invention which has the number of furnace gutters, welding roll passes, welding troughs, and bar pullers equal; Fig. 2, a section taken transversely through the welding troughs; Fig. 3, an enlarged portion of Fig. 2; Fig. 4, a view like Fig. 1, but with the welding roll provided with a plurality of welding grooves or passes and having travel between the furnace and welding troughs; and Fig. 5, a view like Fig. 4, but showing a welding roll with only one groove or pass, it being understood that the welding rolls shown represent diagrammatically only the upper of a pair of rolls.

On the drawings, 1 represents a welding furnace provided with the parallel gutters 2 for the skelp 3 which have been charged into the same from the right in any suitable manner.

4 represents the discharge openings in the furnace, through which the skelp are pushed by any suitable device or mechanism into the passes of the welding rolls 5. These rolls extend along in front of the opening 4 at right angles to the gutters 2 or skelp 3 in the furnace. I have shown the rolls 5 with a separate welding groove or pass 6 in line with the gutters 2 or skelp 3.

7 represents parallel welding troughs which lie directly back of the respective roll passes and in line with the same and the gutters 2 or skelp 3. The troughs lie slightly below the line of travel of the pipes over the mandrel bars 8, of which one is shown over the second trough from the observer, 9 representing the mandrel or pipe-ball thereon. The other mandrel bars are shown in their rearmost position, 10 representing diagrammatically the pullers for the said bars, the pullers equaling the number of bars which in turn preferably equal the number of welding troughs.

11 represents the bar puller troughs which equal the number of bar pullers.

Fig. 4 differs from Fig. 1 only in showing the welding roll 5ª with only two grooves or passes 6 and the bed 12 for the same mounted on the tracks 13 and movable thereon by the pusher 14, so as to bring the grooves 6 in line with the skelp 3.

In Fig. 5, the apparatus is as in Fig. 4, except the welding rolls 5ᵇ have but a single groove or pass 6.

In Figs. 2 and 3, I show the welding troughs on a larger scale in order that their structure may be better understood, the other views being on too small a scale to show the structure complete. Referring to these figures, 15 represents a number of parallel beams supported on the girders 16, which rest on the posts 17. The troughs proper, marked 7, are each composed of a fixed side or wall 18 secured to each beam 15 and a pivoted side or wall 19 pivoted to brackets on the adjacent beam 15. Each pair of walls 18 and 19 are parallel with the beams, their upper edges being separated to form the top of a welding trough 7. From their upper edges the sides 18 and 19 converge downwardly to a line above the top of the chain carrier or conveyer 21 for the pipes.

The carrier 21 is shown composed of endless chains having their upper portions supported by the troughs 22, extending transversely of the troughs 7. The carriers 21 are provided with outwardly projecting fingers 23.

To the lower edges of the sides 18 below the sides 19, I hinge the aprons or guide fingers 24, which guide the pipes 25 from the troughs 7 to the chain carrier when the pivoted trough-sides 19 are swung away from the fixed trough-sides 18, in the manner shown on Fig. 3, where the trough-side 19 is swung away from its companion trough-side 18, and permits the pipe 25 to be directed to the carrier 21 by the guide 24 and into the path of the fingers 23 on the carrier. In the normal practice of the apparatus shown on Fig. 1, the skelp 3 are charged into the furnace 2 in regular order from one side thereof to the other until the gutters 2 are all occupied. When the first skelp charged is ready for welding, it is pushed out through the front of the furnace into the roll pass 6 in line therewith. The skelp is welded in the usual manner over a pipe ball 9 on the forward end of a mandrel bar 8. When the welded pipe has been finished, the mandrel bar is withdrawn from the pipe by the corresponding puller 10, the pipe then lying in the corresponding trough 7. The attendant by any suitable device or mechanism swings the trough-side 19 back as shown on Fig. 3, whereupon the pipe rolls down on the fingers 24 to the chain carrier 21, the fingers 23 of which engage the pipe and push it along beneath the pivoted guide fingers 24 lying in its path, the said fingers swinging up as shown on Fig. 2. The second skelp to be charged is pushed out of the furnace next and the operation described is repeated. The skelp are pushed from the furnace and welded in the same order in which they are charged into the furnace unless for any reason any particular skelp requires to remain longer in the furnace. Fresh skelp are charged into the furnace as soon as possible or practicable after the heated skelp are welded, the entire process being carried on as orderly and as rapidly as possible.

In the apparatus shown on Fig. 1, the process can be carried on with a minimum number of attendants and at a minimum expenditure of mechanical energy and any skelp in the furnace can be drawn when ready without waiting for the rolls to be positioned, or the mandrel-bars to be released from a previous operation and brought into position, or a welding trough to be brought into line or proper condition, or a pipe to be transferred across the welding trough. Every part of the apparatus is always ready under normal intelligent operation for welding any skelp whenever it is ready therefor.

In using the apparatus shown on Fig. 4, two pipes can be consecutively welded without delay, but the rolls cannot be moved in line with another pair of skelp until the last of the first or preceding pair of skelp have been welded. Otherwise, the advantages of the construction shown on Figs. 1 and 4 are the same.

The operation of the apparatus shown on Fig. 5 is the same as that shown on Fig. 4 except that none of the skelp in the furnace can be welded until the skelp previously pushed out of the furnace has been welded and the welding roll has been shifted in line with the next skelp to be welded. However, the advantages of having the welding troughs equal to the number of skelp-heating positions, or gutters, is present as in Figs. 1 and 4. The welding troughs, the pipe conveyer, and the bar pullers are always ready for use when wanted without waiting for any shifting of the same or the welded pipes.

I claim—

1. In a lap-welding apparatus, a furnace having fixed positions in which skelp are charged initially and remain until properly heated, a separate welding trough in line with each of said positions, and means for welding each skelp as it is caused to travel from its position in the furnace to its individual welding trough.

2. In a lap-welding apparatus, a furnace having fixed position in which skelp are charged initially and remain until properly heated, a separate welding trough in line with each of said positions, means for welding each skelp as it is caused to travel from its position in the furnace to its individual welding trough, and separate bar-pulling mechanism in line with each welding trough.

3. In a lap-welding apparatus, a furnace having fixed positions in which skelp are charged initially and remain until properly heated, a separate welding trough in line with each of said positions, and welding rolls located between the furnace and the welding troughs and having a plurality of welding passes.

4. In a lap-welding apparatus, a furnace having fixed positions in which skelp are charged initially and remain until properly heated, a separate welding trough in line with each of said positions, welding rolls located between the furnace and the welding troughs and having a plurality of welding passes, and separate bar-pulling mechanisms in line with each welding trough.

5. In a lap-welding apparatus, a furnace having fixed positions in which skelp are charged initially and remain until properly heated, a separate welding trough in line with each of said positions, and welding rolls located between the furnace and welding troughs and having a welding pass in line with each welding trough.

6. In a lap-welding apparatus, a furnace having fixed positions in which skelp are charged initially and remain until properly heated, a separate welding trough in line with each of said positions, welding rolls located between the furnace and welding troughs and having a welding pass in line with each welding trough, and separate bar-pulling mechanism in line with each welding trough.

Signed at Youngstown, O., this 30th day of October, A. D. 1913.

WILLIAM MARTIN NECKERMAN.

Witnesses:
E. T. McCleary,
Wm. T. Lawthers.

Copies of this patent may be obtained for five cents each, by addressing the "Commissioner of Patents, Washington, D. C."